(12) United States Patent
Chen (10) Patent No.: US 12,119,926 B2
(45) Date of Patent: Oct. 15, 2024

(54) TIME SYNCHRONIZATION METHOD AND DEVICE, AND STORAGE MEDIUM

(71) Applicant: SANECHIPS TECHNOLOGY CO., LTD., Shenzhen (CN)

(72) Inventor: Sisi Chen, Shenzhen (CN)

(73) Assignee: SANECHIPS TECHNOLOGY CO., LTD., Shenzhen (CN)

(*) Notice: Subject to any disclaimer, the term of this patent is extended or adjusted under 35 U.S.C. 154(b) by 675 days.

(21) Appl. No.: 17/293,555

(22) PCT Filed: Sep. 29, 2019

(86) PCT No.: PCT/CN2019/109205
§ 371 (c)(1),
(2) Date: May 13, 2021

(87) PCT Pub. No.: WO2020/098409
PCT Pub. Date: May 22, 2020

(65) Prior Publication Data
US 2022/0006546 A1   Jan. 6, 2022

(30) Foreign Application Priority Data

Nov. 14, 2018 (CN) .......................... 201811355259.2

(51) Int. Cl.
*H04J 3/06*   (2006.01)
*H04W 56/00*   (2009.01)

(52) U.S. Cl.
CPC ......... *H04J 3/0667* (2013.01); *H04W 56/001* (2013.01)

(58) Field of Classification Search
CPC ................. H04J 3/0667; H04J 3/0697; H04W 56/001; H04W 56/0015; H04W 56/00
See application file for complete search history.

(56) References Cited

U.S. PATENT DOCUMENTS 11,476,962 B2 * 10/2022 He ..................... H04J 3/0667
2013/0343409 A1   12/2013 Haulin
(Continued)

FOREIGN PATENT DOCUMENTS

CN   102299788 A   12/2011
CN   102833027 A   12/2012
(Continued)

OTHER PUBLICATIONS

European Search Report for corresponding application EP19885835; Report dated Nov. 30, 2021.
(Continued)

*Primary Examiner* — Chi H Pham
*Assistant Examiner* — Samuel Dilan Rutnam
(74) *Attorney, Agent, or Firm* — CANTOR COLBURN LLP (57) ABSTRACT

Provided are a time synchronization method and device, and a storage medium. The method includes that: a synchronized block matching a preset code pattern in a data stream is searched at a SERDES parallel interface; the position of the bit of the synchronized block in the SERDES parallel interface is determined as a first position; a time point when the synchronized block passes through the SERDES parallel interface is determined as a first time point; the synchronized block and a PTP packet in the data stream are searched at an interface between PHY layer and MAC layer, and a distance between the synchronized block and the PTP packet is determined; and a second time point is determined according to the first position, the first time point and the distance, the second time point being the time point when the PTP packet passes through an SERDES serial interface.

16 Claims, 4 Drawing Sheets

(56) References Cited

U.S. PATENT DOCUMENTS

| | | |
|---|---|---|
| 2015/0055644 A1 | 2/2015 | Bordogna et al. |
| 2017/0064661 A1 | 3/2017 | Katagiri et al. |
| 2018/0191802 A1 | 7/2018 | Yang et al. |
| 2018/0341285 A1* | 11/2018 | Yeh .......................... G06F 1/14 |

FOREIGN PATENT DOCUMENTS

| | | | |
|---|---|---|---|
| CN | 103152118 A | 6/2013 | |
| CN | 107820258 A | 3/2018 | |
| CN | 108270504 A | 7/2018 | |
| KR | 101396912 B1 | 5/2014 | |
| WO | 2017070851 A1 | 5/2017 | |
| WO | WO-2020062225 A1 * | 4/2020 | ............. H04L 25/38 |

OTHER PUBLICATIONS

Felipe Torres-Gonzalez, "Scalability Analysis of the White-Rabbit Technology for Cascade-Chain Networks", IEEE Instrumentation and Measurement Society, 2016.

Huawei, HiSilicon, "Discussion on over-the-air time synchronization for URLLC", 3GPP TSG RAN WG1 Ad Hoc Meeting R1-1800056 Vancouver, Canada, Jan. 22-26, 2018, R1-1800056.

International Search Report for corresponding application PCT/CN2019/109205 filed Sep. 29, 2019; Mail dated Dec. 27, 2019.

Indian Office Action for corresponding application 202117025453; Report dated Mar. 17, 2022.

* cited by examiner

TIME SYNCHRONIZATION METHOD AND DEVICE, AND STORAGE MEDIUM

CROSS-REFERENCE TO RELATED APPLICATIONS

The present disclosure claims priority to Chinese Patent Application No. 201811355259.2, filed to the China Patent Office on Nov. 14, 2018, the disclosure of which is hereby incorporated by reference in its entirety.

TECHNICAL FIELD

The disclosure relates to network communication technologies, and particularly relates but not limited to a time synchronization method and device, and a storage medium.

BACKGROUND

The 1588 time synchronization technology based on Precision Time Protocol (PTP) packet processing is widely used in a 4 Generation (4G) communication network. The time synchronization precision index of the 4G commercial network of the operator is: plus or minus a few microseconds for a basic service, and plus or minus 25 nanoseconds between adjacent single point devices. A 5 Generation (5G) communication network has higher requirements: plus or minus 1 microsecond for a basic service, plus or minus 100 nanoseconds for a collaborative service, and plus or minus 15 nanoseconds between adjacent single point devices. In particular, in a 5G centralized access network, the end-to-end time synchronization precision of high-density base stations requires plus or minus 100 nanoseconds, and for a feed-forward bearer network from a Remote Radio Unit (RRU) to a Distributed Unit (DU), the requirement for the precision is less than plus or minus 10 nanoseconds between the single point devices. An Ethernet interface is usually used to access a 5G feed-forward service, so a communication device accessing an Ethernet service needs to solve the problem of high-precision time synchronization. In the Ethernet 1588 technology in the 4G communication network, the main factor of determining the synchronization precision is that a PTP packet receives and sends a time stamp. The reference plane for the PTP packet to obtain the time stamp is a Port Physical (PHY) layer and Media Access Control (MAC) layer interface. The time stamp obtained in this way will affect the synchronization precision due to delay jitter on a path between the reference plane and the physical interface, so the requirements for high precision of 5G cannot be satisfied.

SUMMARY

In view of this, embodiments of the disclosure provide a time synchronization method and device, and a storage medium.

A technical solution in the embodiments of the disclosure is implemented as follows.

The embodiments of the disclosure provide a time synchronization method, which may include: a synchronized block matching a preset code pattern in a data stream is searched at a Serializer Deserializer (SERDES) parallel interface; the position of the bit of the synchronized block in the SERDES parallel interface is determined as a first position; a time point when the synchronized block passes through the SERDES parallel interface is determined as a first time point; the synchronized block and a PTP packet in the data stream are searched at an interface between a PHY layer and an MAC layer, and a distance between the synchronized block and the PTP packet is determined; and a second time point is determined according to the first position, the first time point and the distance, the second time point being the time point when the PTP packet passes through a SERDES serial interface.

The embodiments of the disclosure provide a time synchronization device, which may include at least a processor and a storage medium configured to store an executable instruction.

The processor is configured to execute the stored executable instruction, and the executable instruction is configured to perform the time synchronization method.

The embodiments of the disclosure provide a computer-readable storage medium storing a computer-executable instruction. The computer-executable instruction is configured to perform the time synchronization method.

The embodiments of the disclosure provide a time synchronization method and device, and a storage medium. First, a synchronized block matching a preset code pattern in a data stream is searched at a SERDES parallel interface; then, the position of the bit of the synchronized block in the SERDES parallel interface is determined as a first position, a time point when the synchronized block passes through the SERDES parallel interface is determined as a first time point; the synchronized block and a PTP packet in the data stream are searched at an interface between a PHY layer and an MAC layer, and a distance between the synchronized block and the PTP packet is determined; finally, a second time point is determined according to the first position, the first time point and the distance, the second time point being the time point when the PTP packet passes through a SERDES serial interface. Thus, in an indirect way, in the processing of a service from the SERDES serial interface to the interface between the PHY layer and the MAC layer, first, a time stamp of the first bit of the synchronized block in the SERDES parallel interface, a deviation position of the synchronized block at the parallel interface and a distance between a header of the interface between the PHY layer and the MAC layer and the synchronized block are obtained; then, based on these parameters, the time point when the PTP packet passes through the SERDES serial interface is determined, thus effectively improving the synchronization precision and meeting the requirements for high precision of 5G.

BRIEF DESCRIPTION OF THE DRAWINGS

In the accompanying drawings (not necessarily drawn to scale), the similar reference signs may describe the similar parts in different views. The similar reference signs with different suffix letters may represent different examples of the similar parts. The accompanying drawings generally show, by example rather than by limitation, the embodiments discussed in the disclosure.

DETAILED DESCRIPTION OF THE EMBODIMENTS

It should be understood that the specific embodiments described here are only used for explaining the disclosure, but not for limiting the disclosure.

In the subsequent description, suffixes such as "module", "part" or "unit" for denoting components are intended only to facilitate the description of the disclosure and has no specific meaning of its own. Thus, "module," "part," or "unit" can be mixed.

Devices may be implemented in various forms. For example, devices described in the disclosure may include a mobile phone, a tablet PC, a laptop, a Personal Digital Assistant (PDA), a Portable Media Player (PMP), a navigation device, a wearable device, a smart bracelet, a pedometer and other mobile devices, as well as fixed devices such as a digital TV and a desktop computer.

The subsequent description will take mobile devices as an example. Those skilled in the art will understand that except a component used especially for mobile purposes, the construction according to the embodiments of the disclosure can also be applied to a fixed device.

Figure 1:
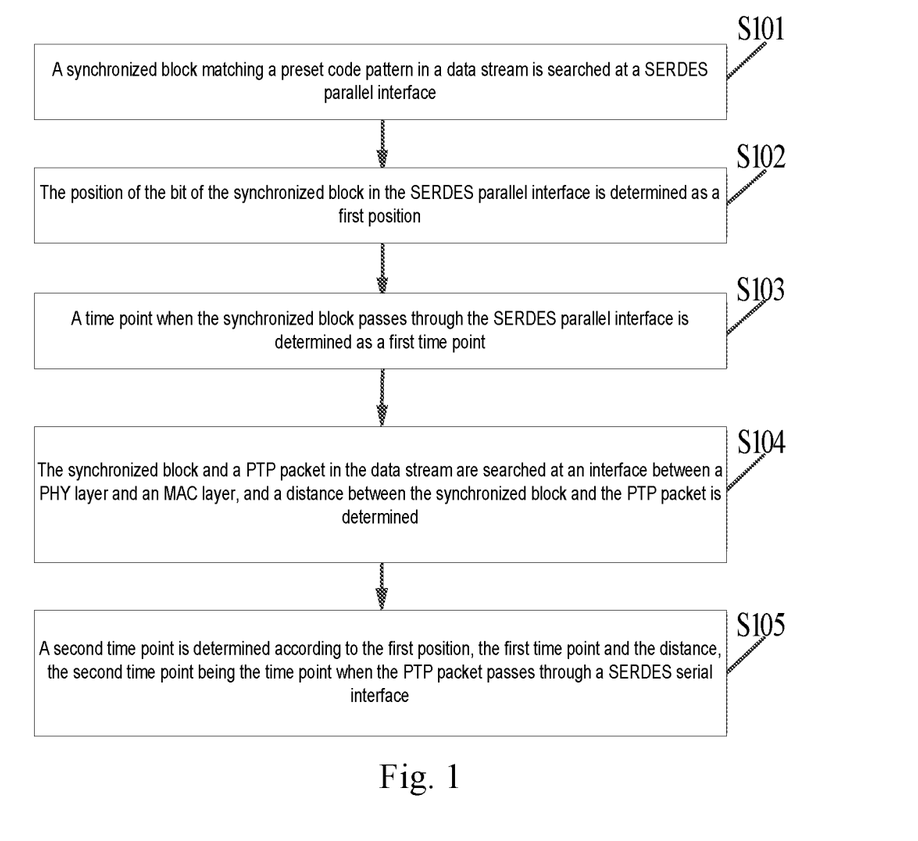
FIG. 1 is an implementation flowchart of a time synchronization method according to an embodiment of the disclosure.

The embodiments of the disclosure provide a time synchronization method. FIG. 1 is an implementation flowchart of the time synchronization method according to an embodiment of the disclosure. As shown in FIG. 1, the method may include the following steps.

At Step 101, a synchronized block matching a preset code pattern in a data stream is searched at a SERDES parallel interface.

Herein, the preset code pattern may be a code pattern specified in the IEEE802.3 protocol. S101 may be understood as that in the SERDES parallel interface, when the synchronized block is searched, first it is determined whether the code pattern of the synchronized block matches the preset code pattern, and if so, the synchronized block is determined as the synchronized block to be searched.

At Step 102, the position of the bit of the synchronized block in the SERDES parallel interface is determined as a first position.

Herein, the first position is the position of a bit corresponding to the first bit of the synchronized block in the SERDES parallel interface. For example, the first bit of the synchronized block is at the eighth bit in the SERDES parallel interface.

At Step 103, a time point when the synchronized block passes through the SERDES parallel interface is determined as a first time point.

Herein, the first time point may be understood as the time point when the first bit of the synchronized block passes through the SERDES parallel interface. That is, when the first bit of the synchronized block passes through the SERDES parallel interface, a time stamp is set and used as the first time point.

At Step 104, the synchronized block and a PTP packet in the data stream are searched at an interface between a PHY layer and an MAC layer, and a distance between the synchronized block and the PTP packet is determined.

Herein, the interface between the PHY layer and the MAC layer is the interface between the PHY layer and the MAC layer. There are two methods for searching the synchronized block in the interface between the PHY layer and the MAC layer.

The first method is that: if the data stream still includes the synchronized block when the data stream is transmitted to the interface between the PHY layer and the MAC layer, the code pattern of the synchronized block is searched directly, and if the code pattern of the synchronized block matches the preset code pattern, the synchronized block is searched.

The second method is that: if the synchronized block no longer exists in the data stream (for example, in the processing of service, the synchronized block is deleted in the data stream) when the data stream is transmitted to the interface between the PHY layer and the MAC layer, then in order to ensure position information of the synchronized block, when the synchronized block is deleted in the data stream, it is needed to save the position information of the first bit of the synchronized block in a data bus and then transmit the position information along with the data stream to the interface between the PHY layer and the MAC layer. In this way, even if the synchronized block is deleted in the data stream during transmission, since the position information of the first bit of the synchronized block in the data bus has been saved in the data stream, the position information of the synchronized block may still be searched at the interface between the PHY layer and the MAC layer.

The distance between the synchronized block and the PTP packet may be understood as the number of bits between the first bit of the header of the PTP packet and the first bit of the synchronized block.

At Step 105, a second time point is determined according to the first position, the first time point and the distance, the second time point being the time point when the PTP packet passes through a SERDES serial interface.

Herein, the second time point is the time point when the first bit of the PTP packet passes through the SERDES serial interface. Step 105 may be understood as that a data model is built according to the first time point, the first position, the distance and other parameters obtained in the SERDES parallel interface and the interface between the PHY layer and the MAC layer, and the time point when the first bit of the PTP packet passes through the SERDES serial interface is calculated through the built data model. In this way, the time stamp of the PTP packet at the SERDES serial interface can be obtained more accurately.

In the embodiments of the disclosure, by obtaining the time stamp of the first bit of the synchronized block at the SERDES parallel interface, the deviation position of the synchronized block at the parallel interface, and the distance between the header of the interface between the PHY layer and the MAC layer and the synchronized block, and obtaining the time point when the PTP packet passes through the SERDES serial interface based on these parameters, the time point when the PTP packet passes through the SERDES serial interface is obtained in an indirect way without sacrificing a search cost, thus improving the synchronization precision.

Figure 2:
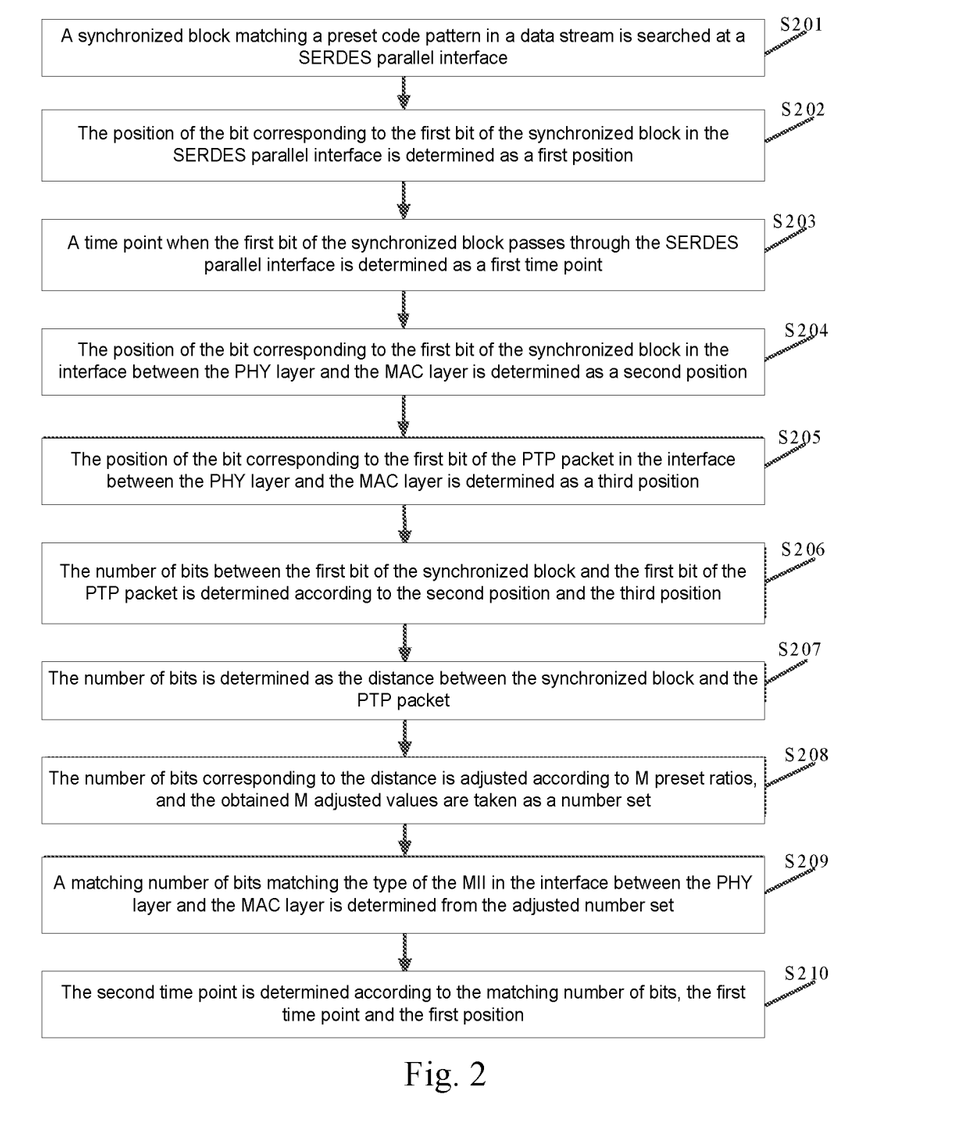
FIG. 2 is an implementation flowchart of another time synchronization method according to an embodiment of the disclosure.

The embodiments of the disclosure provide a time synchronization method. FIG. 2 is an implementation flowchart of another time synchronization method according to an embodiment of the disclosure. As shown in FIG. 2, the method may include the following steps.

At Step 201, a synchronized block matching a preset code pattern in a data stream is searched at a SERDES parallel interface.

At Step 202, the position of the bit corresponding to the first bit of the synchronized block in the SERDES parallel interface is determined as a first position.

Herein, Step 202 may be understood as that after the synchronized block is searched, the time point when the first bit of the synchronized block passes through the SERDES parallel interface and the position of the first bit of the synchronized block in the SERDES parallel interface are determined.

At Step 203, a time point when the first bit of the synchronized block passes through the SERDES parallel interface is determined as a first time point.

At Step 204, the position of the bit corresponding to the first bit of the synchronized block in the interface between the PHY layer and the MAC layer is determined as a second position.

Herein, first the synchronized block meeting the preset code pattern is searched in the interface between the PHY layer and the MAC layer, and then the position of the bit corresponding to the first bit of the synchronized block in the interface between the PHY layer and the MAC layer is determined.

At Step 205, the position of the bit corresponding to the first bit of the PTP packet in the interface between the PHY layer and the MAC layer is determined as a third position.

Herein, first the header of the PTP packet is determined, and then the position of the bit corresponding to the header of the PTP packet in the interface between the PHY layer and the MAC layer is determined.

At Step 206, the number of bits between the first bit of the synchronized block and the first bit of the PTP packet is determined according to the second position and the third position.

Herein, the number of bits between the first bit of the synchronized block and the first bit of the PTP packet is determined according to the position of the bit corresponding to the first bit of the synchronized block in the interface between the PHY layer and the MAC layer and the position of the bit corresponding to the header of the PTP packet in the interface between the PHY layer and the MAC layer.

At Step 207, the number of bits is determined as the distance between the synchronized block and the PTP packet.

At Step 208, the number of bits corresponding to the distance is adjusted according to M preset ratios, and the obtained M adjusted values are taken as a number set.

Herein, M is an integer greater than 1, the number of bits corresponding to the distance is the number of bits between the first bit of the synchronized block and the first bit of the PTP packet; for example, the first bit of the header is searched at a 100 Gigabit Media Independent Interface (CGMII) of the interface between the PHY layer and the MAC layer, and the number of bits between the first bit of the header of the PTP packet and the first bit of the synchronized block is calculated through an accumulator. Because the CGMII takes a 64 bit block as a unit, the number of bits between the first bit of the header of the PTP packet and the first bit of the synchronized block is expressed in a unit of 64 bit, and may be expressed as N. The number set may include a plurality of numbers. For example, when the type of a MII (MII represents a media independent interface, CG represents a rate of 100 GE, and GMII represents a rate of 1 GE) is a CGMII, and the processing of a service from the SERDES serial interface to the interface between the PHY layer and the MAC layer includes Reed-Solomon (RS)(544, 514) Forward Error Correction (FEC) coding and decoding, the parameters included in the number set may be that: the number of bits N corresponding to the distance is adjusted according to the preset ratio, N/4 is rounded to obtain A, and N mod 4 is performed to obtain B; TEMP=257*A+64*B+1+(A/20)*300 is defined; TEMP/40 is rounded to obtain C, and TEMP mod 40 is performed to obtain D; and D/10 is rounded to obtain E, and D mod 10 is performed to obtain F.

At Step 209, a matching number of bits matching the type of the MII in the interface between the PHY layer and the MAC layer is determined from the adjusted number set.

Herein, the type of the MII is specified by the IEEE 802.3 protocol, for example, CGMII, 25GMII, etc. When the type of the MII is the CGMII, the matching number of bits matching the CGMII is determined from the number set, C and F in the number set are determined, and a certain mathematical calculation is performed on the C and F according to the provisions of the IEEE 802.3 protocol, for example, (C*10+F) is taken as the matching number of bits.

At Step 210, the second time point is determined according to the matching number of bits, the first time point and the first position.

In the embodiment of the disclosure, in an indirect way, in the processing of a service from the first position to the interface between the PHY layer and the MAC layer, the process of distribution and change of bit stream is represented by a mathematical model, based on the collected information, the time stamp of the first bit of the synchronized block at the SERDES parallel interface, the deviation position of the synchronized block at the parallel interface and the distance between the header at the interface between the PHY layer and the MAC layer and the synchronized block are calculated through a traffic model, then the time stamp of the PTP packet at the SERDES serial interface is calculated indirectly, and finally the time stamp of the PTP packet at the SERDES serial interface is obtained. In this way, the precision of an Ethernet time stamp is improved, and the timing precision between adjacent single point devices meets the high-precision time synchronization of 5G.

In other embodiments, Step 203 in which the time point when the first bit of the synchronized block passes through the SERDES parallel interface is determined as the first time point may be implemented by the following process:

first, the time point when the first bit, which is determined by the rising edge of a timing clock, of the synchronized block passes through the SERDES parallel interface is determined as a third time point; then, the time point when the first bit, which is determined by the falling edge of a timing clock, of the synchronized block passes through the SERDES parallel interface is determined as a fourth time point; and finally, the smaller one of the third time point and the fourth time point is taken as the time point when the first bit of the synchronized block passes through the SERDES parallel interface. That is, by comparing the timing time points obtained by the rising edge and the falling edge of the timing clock, the smaller one is taken as the first time point. The first time point obtained like this is more accurate.

In the embodiment, when the time point when the first bit of the synchronized block passes through the SERDES parallel interface, the rising edge and the falling edge of the timing clock are respectively used for timing, and then the smaller one is taken as the final result, which can effectively reduce a time error caused by the timing of a clock.

In other embodiments, Step 210 may be implemented by the following steps.

At Step A, the preset number of bits is adjusted according to the number of bits corresponding to the first position to obtain a first number of bits.

Herein, the preset number of bits is a bit width of the SERDES parallel interface. For example, according to the IEEE802.3 protocol, the number of bits corresponding to the SERDES parallel interface is 40 bit, and the first position is m, then the matching number of bits may be (40-m).

At Step B, a second number of bits is determined according to the matching number of bits and the first number of bits.

Herein, the second number of bits is the number of bits between the first bit of the synchronized block and the first bit of the PTP packet in the SERDES serial interface, and the second number of bits may be obtained by adding the matching number of bits to the first number of bits. For example, when the CGMII is used, the C and F in the number set are determined, and a certain mathematical calculation is performed on the C and F according to the provisions of the IEEE 802.3 protocol, and for example, when the data stream flows from the SERDES serial interface, passing through the SERDES parallel interface, to the interface between the PHY layer and the MAC layer (that is, the direction of receiving the PTP packet), (C*10+F) is taken as the matching number of bits. Then, (C*10+F) is added to the first number of bits (40-m) to obtain (C*10+F)-(40-m) as the second number of bits.

At Step C, a standard rate corresponding to the SERDES serial interface is adjusted according to a rate deviation to obtain the actual rate at which the second number of bits is transmitted in the SERDES serial interface.

Herein, the rate deviation is the difference between the actual bit rate of the synchronized block in the SERDES serial interface and the standard bit rate of the SERDES serial interface. When the service type is 100 GE RS(544, 514), the standard bit rate of each channel is 26.5625 Gbps, and the deviation between the actual bit rate and the standard bit rate of a signal in the channel is expressed as parameter P. (26.5625*P) is taken as the actual rate at which the synchronized block is transmitted in the SERDES serial interface.

At Step D, the second number of bits is divided by the actual rate to obtain a first delay.

Herein, the first delay is a time period between the time point when the first bit of the PTP packet passes through the SERDES serial interface and the time point when the first bit of the synchronized block passes through the SERDES serial interface, which may be understood as the difference between the time point when the first bit of the PTP packet passes through the SERDES serial interface and the time point when the first bit of the synchronized block passes through the SERDES serial interface. When the data stream flows from the SERDES serial interface, passing through the SERDES parallel interface, to the interface between the PHY layer and the MAC layer (that is, the direction of receiving the PTP packet), and the service type is 100 GE RS(544, 514), the second number of bits is (C*10+F)-(40-m), the actual rate is (26.5625*P), and then the first delay is [(C*10+F)-(40-m)]/(26.5625*P). At Step E, the second time point is determined according to the first delay, the first time point and the corresponding delay of the synchronized block from the SERDES serial interface to the SERDES parallel interface.

Herein, there may be two situations in Step E according to the different directions of data stream.

The first situation is that: when the data stream flows from the SERDES serial interface, passing through the SERDES parallel interface, to the interface between the PHY layer and the MAC layer (that is, the direction of receiving the PTP packet), first, the first time point is subtracted from the corresponding delay of the synchronized block from the SERDES serial interface to the SERDES parallel interface to obtain a fifth time point, the fifth time point being the time point to be calibrated when the first bit of the synchronized block passes through the SERDES serial interface; and then, the first delay is added to the fifth time point to obtain the second time point.

Herein, the first time point is expressed as Tam, and the corresponding delay of the synchronized block from the SERDES serial interface to the SERDES parallel interface is expressed as Tsds, then the fifth time point is: Tam−Tsds. Then, when the data stream flows from the SERDES serial interface, passing through the SERDES parallel interface, to the interface between the PHY layer and the MAC layer (that is, the direction of receiving the PTP packet), the time point when the PTP packet passes through the SERDES serial interface may be expressed as Tam−Tsds+[(C*10+F)−(40−m)]/(26.5625*P).

The second situation is that: when the data stream flows from the interface between the PHY layer and the MAC layer, passing through the SERDES parallel interface, to the SERDES serial interface (that is, the direction of sending the PTP packet), first, the first time point is added to the corresponding delay of the synchronized block from the SERDES serial interface to the SERDES parallel interface to obtain a sixth time point, Herein the sixth time point being the time point to be calibrated when the first bit of the synchronized block passes through the SERDES serial interface; and then, the sixth time point is added to the first delay to obtain the second time point.

Herein, the number of bits included in the time information is expressed as Tam, and the corresponding delay of the synchronized block from the SERDES serial interface to the SERDES parallel interface is expressed as Tsds, then the sixth time point is: Tam+Tsds. Then, when the data stream flows from the interface between the PHY layer and the MAC layer, passing through the SERDES parallel interface, to the PSERDES serial interface (that is, the direction of sending the PTP packet), the time point when the PTP packet passes through the SERDES serial interface may be expressed as Tam+Tsds+[(C*10+F)+m]/(26.5625*P).

In the embodiments of the disclosure, no matter where the data stream flows, the time stamp of the first bit of the synchronized block in the SERDES parallel interface, the deviation position of the synchronized block at the parallel interface and the distance between a header of the interface between the PHY layer and the MAC layer and the synchronized block can be obtained through the processing of a service from the first position to the interface between the PHY layer and the MAC layer; and based on this, the time point when the PTP packet passes through the SERDES serial interface is determined, thus improving the synchronization precision.

Figure 3:
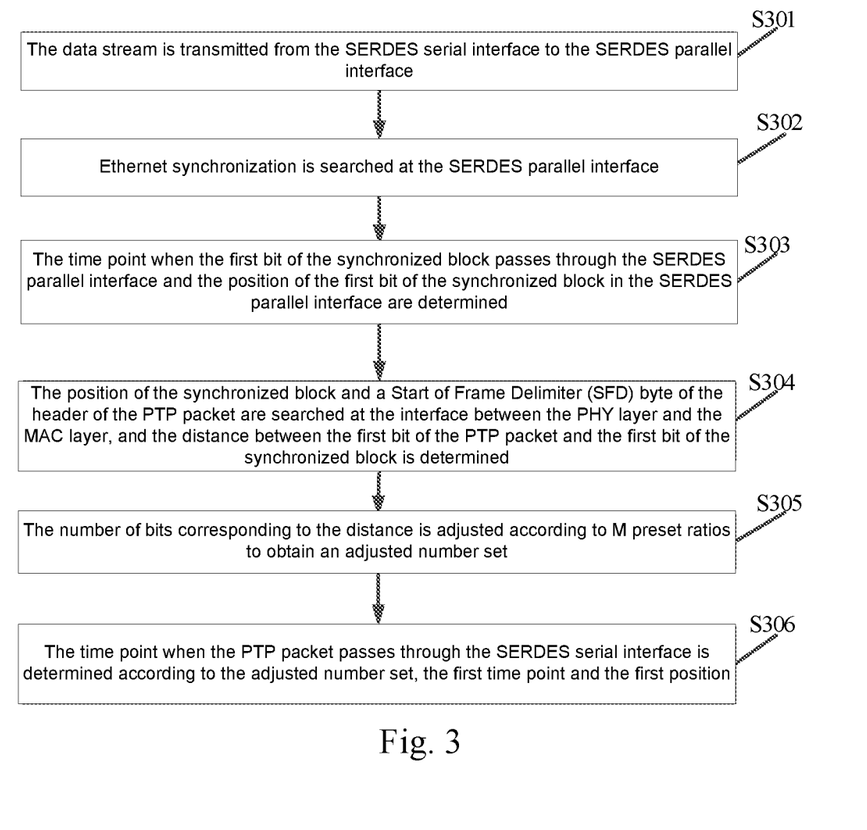
FIG. 3 is an implementation flowchart of yet another time synchronization method according to an embodiment of the disclosure.

The embodiments of the disclosure provide a time synchronization method, which may indirectly obtain, through the traffic model, the time stamp of the PTP packet taking the SERDES serial interface, near a transmission medium physical interface, of the Ethernet service as the reference plane, thus realizing high-precision time synchronization. FIG. 3 is an implementation flowchart of yet another time synchronization method according to an embodiment of the disclosure. As shown in FIG. 3, the method may include the following steps.

At Step 301, the data stream is transmitted from the SERDES serial interface to the SERDES parallel interface.

At Step 302, Ethernet synchronization is searched at the SERDES parallel interface.

At Step 303, the time point when the first bit of the synchronized block passes through the SERDES parallel interface and the position of the first bit of the synchronized block in the SERDES parallel interface are determined.

Herein, the time point obtained in Step 302 is the first time point, and the position of the bit is the first position. The code pattern of the synchronized block is searched at the SERDES parallel interface, and the deviation position of the first bit of the synchronized block at the SERDES parallel interface is recorded. The code pattern of the synchronized block is defined by a series of Ethernet standard 802.3 protocols.

At Step 304, the position of the synchronized block and a Start of Frame Delimiter (SFD) byte of the header of the PTP packet are searched at the interface between the PHY layer and the MAC layer, and the distance between the first bit of the PTP packet and the first bit of the synchronized block is determined.

Herein, the SFD byte of the header of the PTP packet is the first bit of the PTP packet, and the distance is the number of bits between the first bit of the PTP packet and the first bit of the synchronized block.

At Step 305, the number of bits corresponding to the distance is adjusted according to M preset ratios to obtain an adjusted number set.

Herein, the adjusted number set may include more than one parameter. In the embodiment, the adjusted first parameter can accurately reflect the distribution of bit stream and the change of the number of bits in the process of the Ethernet service from the SERDES serial interface to the interface between the PHY layer and the MAC layer.

At Step 306, the time point when the PTP packet passes through the SERDES serial interface is determined according to the adjusted number set, the first time point and the first position.

Figure 4:
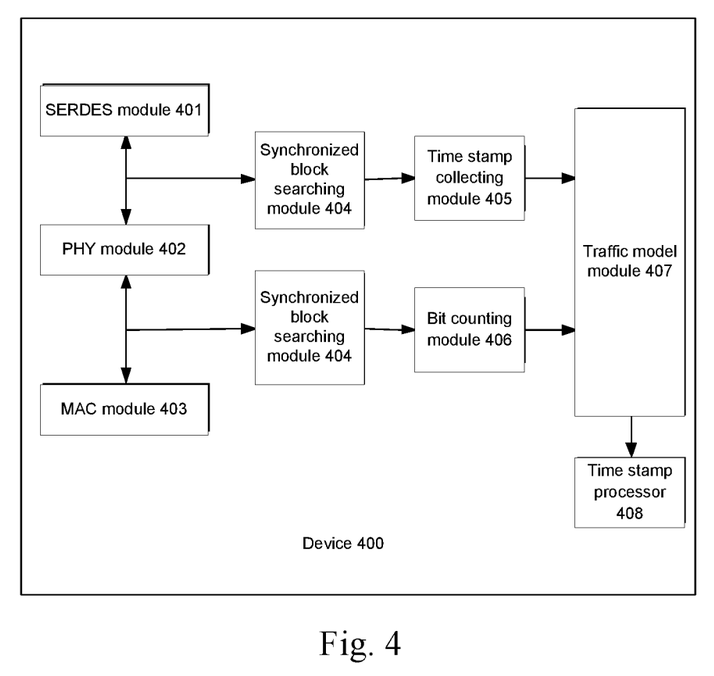
FIG. 4 is a composition structure diagram of an apparatus for implementing the time synchronization method according to an embodiment of the disclosure.

In the embodiments of the disclosure, the time stamp of the PTP packet is obtained taking the SERDES serial interface as the reference plane. FIG. 4 is a composition structure diagram of an apparatus for implementing the time synchronization method according to an embodiment of the disclosure. As shown in FIG. 4, the apparatus 400 may include: a SERDES module 401, a PHY module 402, a MAC module 403, a synchronized block searching module 404, a time stamp collecting module 405, a bit counting module 406, a traffic model module 407 and a time stamp processor 408.

The SERDES module 401 is configured to process a standard Ethernet data packet.

The PHY module 402 is configured to receive and send the PTP packet.

The MAC module 403 is configured to realize a function of bearing the PTP packet in the Ethernet service and the 1588 protocol, and notify the type of the Ethernet service to the traffic model module 407 and the time stamp processor 408.

The synchronized block searching module 404 and the time stamp collecting module 405 are configured to obtain in real time the time stamp when the first bit of the synchronized block passes through the SERDES parallel interface.

The bit counting module 406 is configured to obtain the number of bits between the first bit of the header of the interface between the PHY layer and the MAC layer and the first bit of the synchronized block, and transmit the real-time information to the traffic model module 407 and the time stamp processor 408.

The traffic model module 407 and the time stamp processor 408 are configured to calculate the time stamp when the header of the PTP packet passes through the SERDES serial interface, and return the time stamp to the MAC module 403 for processing the PTP packet.

In the embodiment, the time stamp of the first bit of the synchronized block in the SERDES parallel interface, the deviation position of the synchronized block at the parallel interface and the distance between the interface between the PHY layer and the MAC layer header and the synchronized block are obtained through the processing of a service from the first position to the interface between the PHY layer and the MAC layer, and based on these parameters, the time point when the PTP packet passes through the SERDES serial interface is determined, thus making a progress of significantly improving the time stamp precision of the Ethernet 1588 protocol, and achieving the effect that the timing precision between the adjacent single point devices meets the high-precision time synchronization of 5G.

When the CGMII (that is, the rate is 100 GE) of Ethernet is used, that the time point when the PTP packet passes through the SERDES serial interface is determined may be implemented by the following steps.

First, the SERDES parallel interface used in the embodiment is 40 bit. The code pattern of the synchronized block is specified in the IEEE802.3ba protocol.

At Step 1, the synchronized block is searched at the SERDES parallel interface, when the code pattern of the synchronized block matches the preset code pattern successfully, an indication signal is output, and the position (the first position) of the first bit of the synchronized block at the SERDES parallel interface is recorded and expressed as m.

At Step 2, the indication signal 1 is sampled respectively using the rising edge and the falling edge of the timing clock to obtain two time points, and the smaller one of the two time points is taken as the time stamp (the first time point) of the synchronized block, expressed as Tam.

The timing clock is a clock of 1 gigahertz (GHz) with a step of 1 nanosecond. The time stamp of the synchronized block is the time point when the first bit of the synchronized block passes through the SERDES parallel interface.

At Step 3, the position of the synchronized block is searched at the CGMII of the interface between the PHY layer and the MAC layer, and the first bit of the synchronized block is locked.

Herein, if there is no synchronized block in the data stream of the CGMII, when the data stream flows from the SERDES serial interface, passing through the SERDES parallel interface, to the interface between the PHY layer and the MAC layer, the position of the first bit of the synchronized block on the data bus is given logically by deleting the synchronized block in the PHY layer and transmitted to the CGMII. When the data stream flows from the interface between the PHY layer and the MAC layer, passing through the SERDES parallel interface, to the SERDES serial interface, an inserted position of the synchronized block is given in the MAC layer in advance and transmitted to the CGMII.

At Step 4, the first bit of the header of the PTP packet is searched at the CGMII in the interface between the PHY layer and the MAC layer, and the number of bits between the first bit of the header of the PTP packet and the first bit of the synchronized block, that is, the distance between the synchronized block and the PTP packet, is calculated through the accumulator.

Herein, because the CGMII takes the 64 bit block as a unit, the number of bits between the first bit of the header of the PTP packet and the first bit of the synchronized block may be expressed as a number N a unit of 64 bit, and may be expressed as N in a unit of 64 bit.

At Step 5, the traffic model is built (that is, the adjusted number set is obtained).

Herein, the traffic model is built to show the distribution and change of bit stream from the SERDES serial interface to the interface between the PHY layer and the MAC layer. For example, According to the provisions of the IEEE 802.3 protocol, because the CGMII takes 16384*20 64 bit blocks as a cycle, the first 20 64 bit blocks in the cycle are synchronized blocks AM0 to AM19, and the last 16383*20 64 bit blocks are data blocks.

20 synchronized blocks are converted to 1285 bit CM blocks, constituting five 257 bit blocks. Every four 64 bit data blocks are converted to one 257 bit block. There are 81920 257 bit blocks in one cycle.

Every 20 257 bit blocks constitute one 5140 bit FEC code word. There are 4096 FEC code words in one cycle. In the IEEE 802.3 protocol, the 5140 bit FEC code word is encoded through FEC into the code word in the 5440IEEE 802.3 protocol. The bit rate after encoding is 106.25 megabits per second (Gbps).

The FEC code words are distributed to four physical channels according to a signal of 10 bit, corresponding to four SERDES interfaces. The standard bit rate of each channel is 26.5625 Gbps, and the deviation between the actual bit rate and the standard bit rate of a signal in the channel is expressed as parameter P.

The delay of transmitting the PTP packet from the SERDES serial interface to the SERDES parallel interface is expressed as the parameter Tsds, and based on this, the number of bits (N) included in the distance is adjusted using a preset parameter to obtain the adjusted number set, that is, the traffic model:

N/4 is rounded to obtain A, and N mod 4 is performed to obtain B; TEMP=257*A+64*B+1+(A/20)*300 is defined; TEMP/40 is rounded to obtain C, and TEMP mod 40 is performed to obtain D; and D/10 is rounded to obtain E, and D mod 10 is performed to obtain F (in particular, the value is 10 when F is equal to 0).

At Step 6, the time point (that is, the second time point) when the first bit of the PTP packet passes through the SERDES serial interface is determined based on the adjusted number set (that is, the traffic model), the first time point and the first position.

When the data stream flows from the SERDES serial interface, passing through the SERDES parallel interface, to the interface between the PHY layer and the MAC layer, the calculation formula of the time stamp when the PTP packet passes through the SERDES serial interface is:

$$Tam-Tsds+[(C*10+F)-(40-m)]/(26.5625*P)=Tam-Tsds+[(C*10+F)-(40-m)]*[(32/34/25)*P] \quad (1).$$

In the formula (1), the unit is nanosecond.

When the data stream flows from the interface between the PHY layer and the MAC layer, passing through the SERDES parallel interface, to the SERDES serial interface, the calculation formula of the time stamp when the PTP packet passes through the SERDES serial interface is:

$$Tam+Tsds+[(C*10+F)+m]/(26.5625*P)=Tam+Tsds+[(C*10+F)+m]*[(32/34/25)*P] \quad (2).$$

In the formula (2), the unit is nanosecond.

The time stamp is determined according to the formula and returned to the MAC module for processing the PTP packet.

When 25 GE RS (528, 514) of Ethernet is used, that the time point when the PTP packet passes through the SERDES serial interface is determined may be implemented by the following steps.

First, the SERDES parallel interface used in the embodiment is 40 bit.

At Step 1, the synchronized block is searched at the SERDES parallel interface, when the code pattern of the synchronized block matches the preset code pattern successfully, the indication signal is output, and the position (that is, the first position) of the first bit of the synchronized block at the SERDES parallel interface is recorded and expressed as m.

At Step 2, the indication signal 1 is sampled respectively using the rising edge and the falling edge of the timing clock to obtain two time points, and the smaller one of the two time points is taken as the time stamp (that is, the first time point) of the synchronized block, expressed as Tam.

The timing clock is the clock of 1 gigahertz (GHz) with a step of 1 nanosecond. The time stamp of the synchronized block is the time point when the first bit of the synchronized block passes through the SERDES parallel interface.

At Step 3, the position of the synchronized block is searched at the 25GMII of the interface between the PHY layer and the MAC layer, and the first bit of the synchronized block is locked.

Herein, if there is no synchronized block in the data stream of the 25GMII, when the data stream flows from the SERDES serial interface, passing through the SERDES parallel interface, to the interface between the PHY layer and the MAC layer, the position of the first bit of the synchronized block on the data bus is given logically by deleting the synchronized block in the PHY layer and transmitted to the 15GMII. When the data stream flows from the interface between the PHY layer and the MAC layer, passing through the SERDES parallel interface, to the SERDES serial interface, an inserted position of the synchronized block is given in the MAC layer in advance and transmitted to the 25GMII.

At Step 4, the first bit of the header of the PTP packet is searched at the CGMII in the interface between the PHY layer and the MAC layer, and the number of bits between the first bit of the header of the PTP packet and the first bit of the synchronized block, that is, the distance between the synchronized block and the PTP packet, is calculated through the accumulator.

Herein, because the 25GMII takes the 64 bit block as a unit, the number of bits between the first bit of the header of the PTP packet and the first bit of the synchronized block may be expressed as a number N a unit of 64 bit, and may be expressed as N in a unit of 64 bit.

At Step 5, the traffic model is built (that is, the adjusted number set is obtained).

Herein, the traffic model is built to show the distribution and change of bit stream from the SERDES serial interface to the interface between the PHY layer and the MAC layer. For example, According to the provisions of the IEEE 802.3 protocol, because the 25GMII takes 81916 64 bit blocks as a cycle, one 257 bit synchronized block is inserted in one cycle, and every four 64 bit data blocks are converted to one 257 bit block. There are 20480 257 bit blocks in one cycle.

Every 20 257 bit blocks constitute one 5140 bit FEC code word. There are 1024 FEC code words in one cycle. In the IEEE 802.3 protocol, the 5140 bit FEC code word is encoded through FEC into the code word in the 5440IEEE 802.3 protocol in the 25GMII. The bit rate after encoding is 103.125 Gbps.

The FEC code words are distributed to one physical channel according to the signal of 10 bit, corresponding to one SERDES interface. The standard bit rate of the channel is 25.78125 Gbps, and the deviation between the actual bit rate and the standard bit rate of a signal in the channel is expressed as parameter P.

The delay of transmitting the PTP packet from the SERDES serial interface to the SERDES parallel interface is expressed as the parameter Tsds, and based on this, the number of bits (N) included in the distance is adjusted using a preset parameter to obtain the adjusted number set, namely the traffic model:

N/4 is rounded to obtain A, and N mod 4 is performed to obtain B; then TEMP=257*A+64*B+1+(A/20)*140 is defined. In the embodiment, based on these adjusted number sets, the distribution of bit stream and the change of the number of bits in the process of the Ethernet service from the SERDES serial interface to the interface between the PHY layer and the MAC layer are reflected accurately.

At Step 6, the time point (that is, the second time point) when the PTP packet passes through the SERDES serial interface is determined based on the adjusted number set (that is, the traffic model), the first time point and the position of the bit.

When the data stream flows from the SERDES serial interface, passing through the SERDES parallel interface, to the interface between the PHY layer and the MAC layer, the calculation formula of the time stamp when the PTP packet passes through the SERDES serial interface is:

$$Tam-Tsds+[(TEMP)-(40-m)]/(25.78125*P)=Tam-Tsds+[(TEMP)-(40-m)]*[(32/33/25)*P] \quad (3).$$

In the formula (3), the unit is nanosecond.

When the data stream flows from the interface between the PHY layer and the MAC layer, passing through the SERDES parallel interface, to the SERDES serial interface, the calculation formula of the time stamp when the PTP packet passes through the SERDES serial interface is:

$$Tam+Tsds+[(TEMP)+m]/(25.78125*P)=Tam+Tsds+[(TEMP)+m]*[(32/33/25)*P] \quad (4).$$

In the formula (4), the unit is nanosecond.

The time stamp is determined according to the formula and returned to the MAC module for processing the PTP packet.

In the embodiments of the disclosure, in an indirect way, in the processing of a service from the first position to the interface between the PHY layer and the MAC layer, the process of distribution and change of bit stream is represented by a mathematical model, based on the collected information, the time stamp of the first bit of the synchronized block at the SERDES parallel interface, the deviation position of the synchronized block at the parallel interface and the distance between the header at the interface between the PHY layer and the MAC layer and the synchronized block are calculated through a traffic model, then the time stamp of the PTP packet at the SERDES serial interface is calculated indirectly, and finally the time stamp of the PTP packet at the SERDES serial interface is obtained. In this way, the search cost will not be increased, and the influence of delay jitter on a path of the time stamp from the SERDES serial interface to the interface between the PHY layer and the MAC layer can be overcome, thus improving the time stamp precision in the Ethernet 1588 protocol, and achieving the effect that the timing precision between the adjacent single point devices meets the high-precision time synchronization of 5G.

Figure 5:
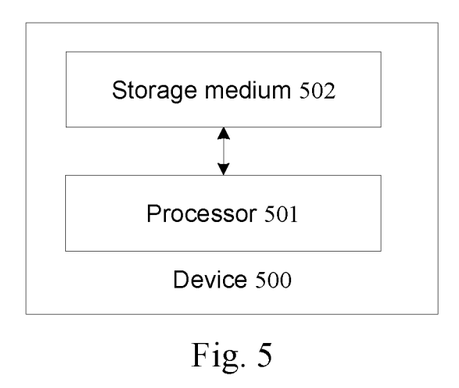
FIG. 5 is a composition structure diagram of a time synchronization device according to an embodiment of the disclosure.

The embodiments of the disclosure provide a time synchronization device. FIG. 5 is a composition structure diagram of a time synchronization device according to an embodiment of the disclosure.

The device 500 may include at least a processor 501 and a storage medium 502 storing an executable instruction.

The processor 501 is configured to execute the stored executable instruction, and the executable instruction is configured to perform the following steps:

the synchronized block matching the preset code pattern in the data stream is searched at the SERDES parallel interface;

the position of the bit of the synchronized block in the SERDES parallel interface is determined as the first position;

the time point when the synchronized block passes through the SERDES parallel interface is determined as the first time point;

the synchronized block and the PTP packet in the data stream are searched at the interface between the PHY layer and the MAC layer, and the distance between the synchronized block and the PTP packet is determined; and the second time point is determined according to the first position, the first time point and the distance, the second time point being the time point when the PTP packet passes through the SERDES serial interface.

It is to be noted that, in the embodiments of the disclosure, when being implemented in form of software function module and sold or used as an independent product, the time synchronization method may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, and the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the disclosure is not limited to any specific combination of hardware and software.

Correspondingly, an embodiment of the disclosure provides a computer storage medium storing a computer-executable instruction. The computer-executable instruction is configured to perform the time synchronization method provided in other embodiments of the disclosure.

Those skilled in the art should understand that the embodiments of the disclosure may be provided as a method, a system or a computer program product. Thus, the disclosure may adopt the forms of a hardware embodiment, a software embodiment, or an embodiment combining software and hardware. Moreover, the disclosure may adopt the form of a computer program product implemented on one or more computer available storage media (including, but not limited to, a disk memory and an optical memory) containing computer available program codes.

The disclosure is described with reference to flowcharts and/or block diagrams of the method, the device (system) and the computer program product according to the embodiments of the disclosure. It should be understood that each flow and/or block in the flowchart and/or block diagram, and the combination of the flow and/or block in the flowchart and/or block diagram can be implemented by the computer program instructions. These computer program instructions can be provided to a processor of a general-purpose computer, a special-purpose computer, an embedded processor or other programmable data processing devices to generate a machine, so that instructions which are executed by the processor of the computer or other programmable data processing devices generate a device which is used for implementing the specified functions in one or more flows of the flowchart and/or one or more blocks of the block diagram.

These computer program instructions may also be stored in the computer-readable memory which can guide the computer or other programmable data processing devices to work in a particular way, so that the instructions stored in the computer-readable memory generate a product including an instruction device. The instruction device implements the specified functions in one or more flows of the flowchart and/or one or more blocks of the block diagram.

These computer program instructions may also be loaded on the computer or other programmable data processing devices, so that a series of operation steps are performed on the computer or other programmable data processing devices to generate the processing implemented by the computer, and the instructions executed on the computer or other programmable data processing devices provide the steps for implementing the specified functions in one or more flows of the flowchart and/or one or more blocks of the block diagram.

The above is only the preferred embodiments of the disclosure and not intended to limit the protection scope of the disclosure.

What is claimed is:

1. A time synchronization method, comprising:
   searching, at a Serializer Deserializer (SERDES) parallel interface, a synchronized block matching a preset code pattern in a data stream;
   determining a position of a bit of the synchronized block in the SERDES parallel interface as a first position;
   determining a time point when the synchronized block passes through the SERDES parallel interface as a first time point;
   searching the synchronized block and a Precision Time Protocol (PTP) packet in the data stream at an interface between a Physical (PHY) layer and a Media Access Control (MAC) layer, and determining a distance between the synchronized block and the PTP packet; and
   determining a second time point according to the first position, the first time point and the distance, and the second time point being a time point when the PTP packet passes through a SERDES serial interface;
   wherein determining a second time point according to the first position, the first time point and the distance comprises:
   adjusting the number of bits corresponding to the distance according to M preset ratios, taking the obtained M adjusted values as a number set, M being an integer greater than 1;
   determining, from the number set, the number of bits matching the type of a Media Independent Interface (MII) in the interface between the PHY layer and the MAC layer as a matching number of bits; and
   determining the second time point according to the matching number of bits, the first time point and the first position;
   wherein determining the second time point according to the matching number of bits, the first time point and the first position further comprises:
   adjusting a preset number of bits according to the number of bits corresponding to the first position to obtain a first number of bits, the preset number of bits being a bit width of the SERDES parallel interface;
   determining a second number of bits according to the matching number of bits and the first number of bits, the second number of bits being the number of bits between the first bit of the synchronized block and the first bit of the PTP packet in the SERDES serial interface;
   adjusting a standard rate corresponding to the SERDES serial interface according to a rate deviation to obtain the actual rate at which the second number of bits is transmitted in the SERDES serial interface, the rate deviation being a difference between the actual bit rate in the SERDES serial interface and the standard bit rate of the SERDES serial interface;
   dividing the second number of bits by the actual rate to obtain a first delay, the first delay being a time period between the time point when the first bit of the PTP packet passes through the SERDES serial interface and the time point when the first bit of the synchronized block passes through the SERDES serial interface; and
   determining the second time point according to the first delay, the first time point and the corresponding delay of the synchronized block from the SERDES serial interface to the SERDES parallel interface.

2. The method according to claim 1, wherein determining the position of the bit of the synchronized block in the SERDES parallel interface as a first position comprises: determining a position of the first bit of the synchronized block in the SERDES parallel interface as the first position;
   determining a time point when the synchronized block passes through the SERDES parallel interface as a first time point comprises: determining a time point when the first bit of the synchronized block passes through the SERDES parallel interface as the first time point;
   correspondingly, the second time point is a time point when the first bit in the PTP packet passes through the SERDES serial interface.

3. The method according to claim 1, wherein determining the time point when the first bit of the synchronized block passes through the SERDES parallel interface as the first time point comprises:
   determining a time point when the first bit of the synchronized block passes through
   the SERDES parallel interface as a third time point, which is determined by a rising edge of a timing clock;
   determining a time point when the first bit of the synchronized block passes through the SERDES parallel interface as a fourth time point, which is determined by a falling edge of the timing clock; and
   taking the smaller one of the third time point and the fourth time point as the first time point.

4. The method according to claim 1, wherein searching the synchronized block and a PTP packet in the data stream at an interface between a PHY layer and an MAC layer, and determining a distance between the synchronized block and the PTP packet comprises:

determining the corresponding position of the first bit of the synchronized block in the interface between the PHY layer and the MAC layer as a second position;

determining the corresponding position of the first bit of the PTP packet in the interface between the PHY layer and the MAC layer as a third position;

determining, according to the second position and the third position, a number of bits between the first bit of the synchronized block and the first bit of the PTP packet; and determining the number of bits as the distance between the synchronized block and the PTP packet.

5. The method according to claim 1, wherein determining the second time point according to the first delay, the first time point and the corresponding delay of the synchronized block from the SERDES serial interface to the SERDES parallel interface comprises:

when the data stream flows from the SERDES serial interface, passing through the SERDES parallel interface, to the interface between the PHY layer and the MAC layer, performing a subtract operation between the first time point and the corresponding delay of the synchronized block from the SERDES serial interface to the SERDES parallel interface to obtain a fifth time point, the fifth time point being the time point when the first bit of the synchronized block passes through the SERDES serial interface;

and adding the first delay to the fifth time point to obtain the second time point.

6. The method according to claim 1, wherein determining the second time point according to the first delay, the first time point and the corresponding delay of the synchronized block from the SERDES serial interface to the SERDES parallel interface comprises:

when the data stream flows from the interface between the PHY layer and the MAC layer, passing through the SERDES parallel interface, to the SERDES serial interface, adding the first time point to the corresponding delay of the synchronized block from the SERDES serial interface to the SERDES parallel interface to obtain a sixth time point, the sixth time point being the time point when the first bit of the synchronized block passes through the SERDES serial interface; and adding the sixth time point to the first delay to obtain the second time point.

7. A time synchronization device, comprising at least: a processor and a storage medium configured to store an executable instruction, wherein
the processor is configured to execute the stored executable instruction, and the executable instruction is configured to perform a time synchronization method as claimed in claim 1.

8. A non-transitory computer-readable storage medium, storing a computer-executable instruction, wherein the computer-executable instruction is configured to perform a time synchronization method as claimed in claim 1.

9. A time synchronization device, comprising at least: a processor and a storage medium configured to store an executable instruction, wherein
the processor is configured to execute the stored executable instruction, and the executable instruction is configured to perform a time synchronization method as claimed in claim 2.

10. A time synchronization device, comprising at least: a processor and a storage medium configured to store an executable instruction, wherein
the processor is configured to execute the stored executable instruction, and the executable instruction is configured to perform a time synchronization method as claimed in claim 3.

11. A time synchronization device, comprising at least: a processor and a storage medium configured to store an executable instruction, wherein
the processor is configured to execute the stored executable instruction, and the executable instruction is configured to perform a time synchronization method as claimed in claim 4.

12. A time synchronization device, comprising at least: a processor and a storage medium configured to store an executable instruction, wherein
the processor is configured to execute the stored executable instruction, and the executable instruction is configured to perform a time synchronization method as claimed in claim 5.

13. A time synchronization device, comprising at least: a processor and a storage medium configured to store an executable instruction, wherein
the processor is configured to execute the stored executable instruction, and the executable instruction is configured to perform a time synchronization method as claimed in claim 6.

14. A non-transitory computer-readable storage medium, storing a computer-executable instruction, wherein the computer-executable instruction is configured to perform a time synchronization method as claimed in claim 2.

15. A non-transitory computer-readable storage medium, storing a computer-executable instruction, wherein the computer-executable instruction is configured to perform a time synchronization method as claimed in claim 3.

16. A non-transitory computer-readable storage medium, storing a computer-executable instruction, wherein the computer-executable instruction is configured to perform a time synchronization method as claimed in claim 4.

\* \* \* \* \*